United States Patent [19]

Barrett et al.

[11] Patent Number: 4,601,477
[45] Date of Patent: Jul. 22, 1986

[54] SABRE SAW BLADE CLAMP

[75] Inventors: Michael E. Barrett; Chris Johnson, both of Easley, S.C.

[73] Assignee: The Singer Company, Stamford, Conn.

[21] Appl. No.: 690,220

[22] Filed: Jan. 10, 1985

[51] Int. Cl.⁴ .............................................. B27B 19/00
[52] U.S. Cl. ..................................... 279/30; 279/1 B; 279/76; 30/394
[58] Field of Search ....................... 279/22, 30, 75, 76, 279/123, 81, 78, 1 B; 30/394

[56] References Cited

U.S. PATENT DOCUMENTS 2,580,930  1/1952  Kost ...................................... 279/30

Primary Examiner—Z. R. Bilinsky
Attorney, Agent, or Firm—Robert E. Smith; David L. Davis; Edward L. Bell

[57] ABSTRACT

A clamp for a reciprocatory tool blade is disclosed having a spring loaded roller constrained in an inclined blade accommodating cavity which so effectively forces the roller into clamping relation against a tool blade shank that no special blade shank configuration is required and manual shift of the roller against the spring load provides for ready removal of the tool blade.

6 Claims, 6 Drawing Figures

SABRE SAW BLADE CLAMP

BACKGROUND OF THE INVENTION

This invention relates to a blade or tool clamp for a reciprocating blade or tool such as a sabre saw blade; and more particularly, to a blade clamp which will accept and grip an unnotched or unapertured blade upon simple insertion thereof, hold the blade firmly in use, and readily release the blade upon exertion of slight pressure on a release device.

In the prior art there have been many efforts to insure that a tool such as sabre saw blade, which undergoes endwise reciprocation and is, therefore, subject to extreme dislodging force, will remain in the inserted position. For example, in U.S. Pat. No. 3,781,025, of Di Angelo, two set screws are used on opposite sides of the chuck and longitudinally spaced from each other in order to force a slight "S" bend in the saw blade in order to firmly retain the same against the reciprocating forces tending to dislodge the saw blade. In this patent, it is noted that plural sets of set screws contacting the blade at right angles have also been used but found to be not entirely satisfactory.

Attempts to retain the sabre saw blade have utilized many forms of edge cut outs in the shank of the blade, which cut outs are engaged by cams or rollers in the inserted position of the blade to retain the same firmly. An example of this type of construction might be seen in the U.S. Pat. No. 4,299,402, of Hoffman.

In the U.S. Pat. No. 3,583,716 of Daniel, Jr., a quick attachment of a saw blade to a saw bar is obtained by utilizing a saw blade having a shank with an aperture therethrough, which aperture receives an inwardly cammed ball bearing to lock the saw blade to the saw bar during endwise reciprocation of the same. This assembly is readily effected by rotating the cam to allow the ball bearing to withdraw from the aperture in the saw blade shank, whereupon the saw blade may be removed.

However, these prior art devices either place an excessive strain upon the saw blade by local deformation of the same; or by requiring a particular blade aperture or edge cut out, restrict each chuck to use only with its own particular saw blade arrangement. It is apparent that what is required is a sabre saw blade clamp which is capable of accommodating any arrangement of sabre saw blade shank so as to avoid excessive strain thereon or the necessity for any particular configuration of edge cut out or aperture. Ideally, it should be accomplished as economically and as simply as possible.

SUMMARY OF THE INVENTION

The above desired ends are achieved in a blade clamp for a power tool such as a sabre saw in which a blade clamp body is attached to a reciprocatory actuating bar, which body is formed with a cavity having a mouth to accommodate the shank of a saw blade therein and a wall providing a blade seating surface. The blade clamp body cavity is formed opposite the blade seating surface with a ramp tapering toward the cavity mouth. A hardened, smooth or knurled roller is captured between the ramp and the blade seating surface of the blade clamp body. A resilient device presses against the upper surface of the roller to force the same downwardly along the ramp surface, and thus also inwardly towards the blade seating surface of the blade clamp body. The resilient means may be implemented by an elastomeric material captured between the upper surface of the blade clamp body and the roller so as to constantly urge the roller downwardly. The downward motion of the roller may be reversed by a blade release plunger which extends inwardly beneath the roller towards the blade seating surface of the blade clamp body, and may be further urged inwardly to raise the roller against the urging of the elastomeric member. Alternatively, a leaf spring may be affixed to the blade clamp body by means of a screw, with an arm extending above the roller to urge the same downwardly along the ramp surface, and the other arm thereof extending upwardly through the mouth of the cavity between the ramp surface and the blade seating surface of the blade clamp body in a position where it may be urged upwardly by an operator's finger to engage the roller so as to dislodge the roller from engagement with the shank of the sabre saw blade for removal of the same. Thus, a sabre saw blade inserted into the mouth of the blade clamp body cavity will be captured between the roller and the blade seating surface in the blade clamp body, with the roller being urged downwardly by the resilient member to firmly capture the sabre saw blade. An abutment or upper seating surface is provided for the sabre saw blade to restrict its upward motion, and upward motion of the sabre saw blade occasioned by the reciprocating bar will not act to withdraw the saw blade from the blade clamp body since the inertia of the roller during this motion also tends to cause the roller to pinch the shank of the saw blade even more firmly. On the other hand, removal of the saw blade is readily implemented by urging the roller upwardly to a release position.

BRIEF DESCRIPTION OF THE DRAWINGS

A better understanding of the invention, and of the various embodiments thereof, may be derived from the following description and the accompanying drawings in which.

DESCRIPTION OF THE INVENTION

Figure 1:
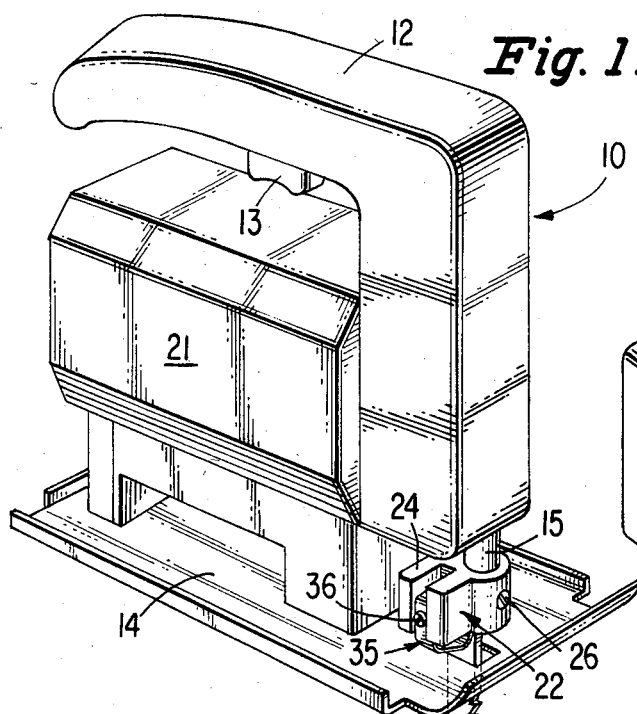
FIG. 1 is a perspective view of a sabre saw in which one preferred embodiment of this invention has been incorporated.

A conventional sabre saw 10 is illustrated in FIG. 1, this sabre saw including a handle 12 which may be grasped by an operator in pressing the sabre saw work table 14 against a work material and in guiding the sabre saw. The sabre saw 10 includes a saw blade indicated generally at 16 which extends through the work table 14 to operate on the work material that the work table abuts. The saw blade, which may be of any known configuration, includes a shank 17 which, for the purpose of the blade clamp of this invention, is not required to be notched, apertured, knurled, or otherwise configured in any special way. That is, the shank 17 is preferrably of rectangular shape including plain flat sides 18 and plain narrow edges 19 although the clamp of this invention will accept and satisfactorily grip notched, apertured and other variously shaped blade shanks provided only that the shank does not exceed the overall dimensional limitations of the blade clamp. As is conventional in sabre saw blades, one narrow edge 19 below the shank is formed with cutting teeth 20. The saw blade 16 is operated by means of an endwise reciprocatory bar 15 when the trigger switch 13 in the handle 12 is depressed by an operator to activate a motor supported in motor housing 21, through a mechanism well known in the sabre saw art. The saw blade 16 is secured to the actuating bar 15 by a blade clamp indicated generally at 22 which is the subject of this invention.

Figure 2:
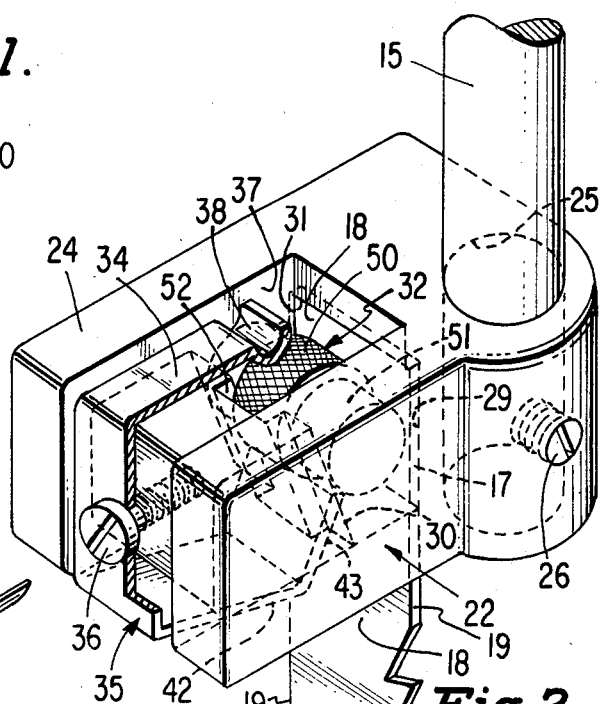
FIG. 2 is an enlarged perspective view of the blade clamp shown in the sabre saw of FIG. 1 with portions of the roller influencing spring broken away.
Figure 3:
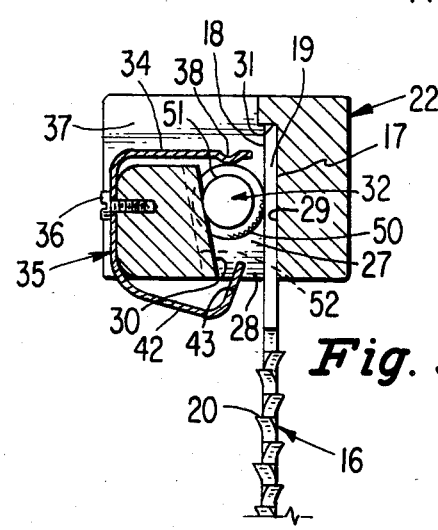
FIG. 3 is a cross sectional view of a blade clamp similar to that of FIGS. 1 and 2 showing the saw blade held in the blade clamping position.
Figure 4:
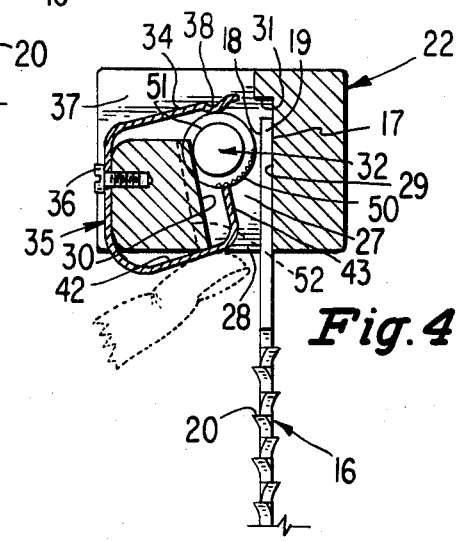
FIG. 4 is a view similar to FIG. 3 but illustrating the blade clamp being operator influenced into a blade releasing position.

Referring to FIGS. 2, 3 and 4, one form of the blade clamp 22 is shown enlarged and in cross section clearly to disclose the internal details thereof. In these figures, the blade clamp 22 is shown to include a blade clamp body 24 having an aperture 25 for receiving the reciprocatory actuating bar 15, which actuating bar may be retained by means of a set screw 26. Extending behind the actuating bar 15 in the blade clamp body 24 is a cavity 27 having an exteriorly open mouth 28 for accommodating the shank 17 of the saw blade 16. One side of the interior of the cavity 27 is defined by a substantially planar first wall 29 extending parallel to the direction of reciprocation of the actuating bar and preferably centered behind the aperture 25 accommodating the actuating bar. The wall 29 defines one sidewall of the cavity mouth 28 and preferrably is dimensioned to accommodate one flat side 18 of a sabre saw blade. Arranged opposite and facing the wall 29 is a second interior cavity wall 30 which is inclined relative to the direction of reciprocation of the actuating bar 15 and toward the mouth 28. As shown in the accompanying drawings, it is preferable but not essential that the second cavity wall 30 defines the opposite sidewall of the cavity mouth 28.

An abutment 31, which may project into the cavity 27 from the first wall 29, limits insertion of a saw blade shank into the cavity 27 along the first wall 29 as shown in FIG. 3. Situated between the first and second walls 29 and 30 within the cavity 27 is a roller indicated generally at 32 preferably having a knurled outer surface. Because of inclination of the second wall 30, the roller 32 when moved downwardly toward the cavity mouth 28 will wedge against and clamp a saw blade shank 17 that is inserted into the cavity along the first cavity wall 29.

For urging the roller downwardly into blade clamping position, a resilient means is provided acting between the blade clamp body 24 and that side of the roller opposite the cavity mouth 28. As shown in FIGS. 2 and 3, the resilient means may take the form of one arm 34 of a leaf spring 35 which is secured as by a screw 36 exteriorly of the blade clamp body 24. The spring arm 34 extends into the cavity 27 through an exteriorly open passageway 37 in the clamp body and may be formed at the extremity of the arm 34 with a roller engaging detent 38.

The leaf spring 35 is further formed with a lower arm 42 which extends beneath the clamp body and terminates in an upwardly offset finger 43 located beneath the mouth 28 of the cavity 27. The lower spring arm 42 serves as a tool blade release means in that it may be deflected upwardly by upward pressure exerted by an operator's finger, as illustrated in FIG. 4, to shift the finger 43 upwardly into the cavity mouth 28 into engagement with that side of the roller 32 facing the cavity mouth to move the roller upwardly against the influence of the spring arm 34 and out of clamping engagement with the saw blade shank 17. When the roller is thus moved, the saw blade is freed for removal from the blade clamp body 24.

In the construction illustrated in FIGS. 2, 3 and 4, the lower arm 42 and finger 43 may also serve to constrain the roller within the clamp body cavity 27 when no blade is present in the clamp body.

The roller 32 may be formed of uniform diameter and knurled over its entire length in which case the second cavity wall 30 may be formed to define a single plane surface. However, with such an arrangement, constant use may cause the knurled roller to abraid the second cavity wall which eventually may shorten the useful life of the blade clamp. In a preferrable construction, as shown in FIGS. 2, 3 and 4, the roller 32 is provided with a centrally arranged knurled portion 50 with a smooth coaxial cylindrical stem portion 51 formed at each side of the knurled portion 50. The second wall 30 is formed with a clearance slot 52 accommodating the knurled portion 50 of the roller so that only the smooth stem portions 51 engage the second wall 30. In this way wear of the clamp is greatly reduced without detracting from the clamping qualities of the blade clamp.

To use the blade clamp of this invention, the shank 17 of the saw blade 16 is simply inserted into the cavity 27 of the blade clamp body 24 between the roller 32 and the cavity wall 29. This action lifts the roller 32 and allows the shank 17 of the saw blade 16 to progress upwardly along the wall 29 into engagement with the abutment 31. The smooth cylindrical stem portions 51 of the roller 32 are maintained in contact with the second wall 30 within the cavity and the knurled portion 50 of the roller is maintained in contact with one flat side 18 of the shank 17 of the saw blade 16 by the action of the spring arm 34 pressing the roller downwardly into a position pinching the shank 17 between the roller and the first wall 29 of the blade clamp body 24. On downward motion of the actuating bar 18, the saw blade 16 tends to be forced upwardly by friction with the work material so that the shank 17 seats more firmly against the abutment 31. As the actuating bar rises, carrying the blade 16 with it, any forces tending to withdraw the shank 17 of the saw blade 16 from the cavity would, because of the inertia of the roller, also tend to move the roller 32 downwardly to increase the pinching action between the roller 32 and the saw blade. In order to remove the saw blade 16, as mentioned above, the lower arm 42 of the leaf spring 36 is deflected upwardly as shown in FIG. 4, to elevate the roller 32 out of contact with the saw blade shank.

Figures 5, 6:
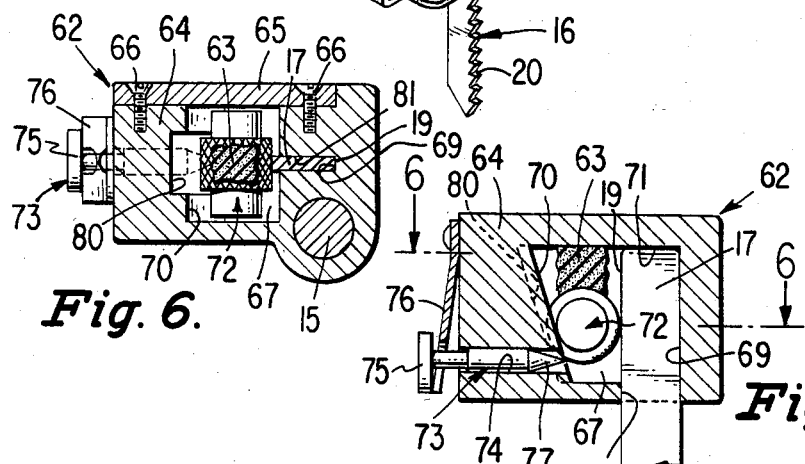
FIG. 5 is a cross sectional view of a modified form of blade clamp in accordance with this invention.
FIG. 6 is a cross sectional view taken substantially along line 6—6 of FIG. 5.

Referring now to FIGS. 5 and 6, there is shown a modified blade clamp indicated generally at 62. One difference between the construction shown in FIGS. 5 and 6 and that of FIGS. 2, 3 and 4 is that the leaf spring 35 is replaced by a globule 63 of elastomeric material. In the construction of FIGS. 5 and 6, a slightly modified blade clamp body 64 is utilized having main cavity portion 67 which is closed except for an exteriorly open mouth 68 corresponding in overall size to that of the size of the saw blade shank. As shown in FIG. 6, a rear closure 65 secured by screws 66 may be provided for the cavity 67.

The construction of FIGS. 5 and 6 also differs from that of FIGS. 2, 3 and 4 in that the tool blade release means is provided by an ejector pin 73 which extends through a guide aperture 74 in the clamp body 64. The ejector pin 73 is formed with an enlarged head 75 and is embraced by a bifurcated leaf spring 76 secured exteriorly of the clamp body, which spring maintains the ejector pin retracted as shown in FIG. 5. To release a saw blade from the clamp, it is only necessary for an operator to depress the head 75 of the ejector pin 73 causing the tapered inner extremity 77 of the ejector pin to engage that side of a roller 72 facing the cavity mouth and elevate the roller against the force of the elastomeric globule and out of clamping relation with a saw blade shank.

The roller 72 in the form of construction shown in FIGS. 5 and 6 may take the same form as that of the roller 32 in FIGS. 2, 3 and 4 and on inclined second wall 70 may similarly be slotted as at 80 to provide clearance for the knurled portion of the roller.

A further difference in the form of construction shown in FIGS. 5 and 6 from that of FIGS. 1 to 4 involves the shape and arrangement of a sabre saw blade accommodating portion 81 which extends from the main cavity 67. In FIGS. 5 and 6, the saw blade accommodating portion 81 of the cavity 67 is shown to be shaped so as to accommodate the blade with only one narrow edge 19 extending into the main cavity portion 67 and facing the roller 72 and the inclined second wall 70 of the cavity 67. A first wall 69 of the cavity 67 is arranged within the blade accommodating portion 81 and is substantially parallel to the direction of reciprocation of the blade clamp 64 so as to be adapted to seat the opposite narrow edge 19 of the saw blade. The blade orientation with respect to the roller illustrated in FIGS. 5 and 6 has been found to be preferable in that it provides for substantial increase in unit pressure applied by the roller and acting between the saw blade and the first cavity wall 69 resulting in more secure clamping of the saw blade in the clamp body.

The top wall 71 of the saw blade accommodating cavity portion 81 and of the main cavity portion 67 provides the stop abutment limiting insertion of a saw blade into the blade clamp.

We claim:

1. A blade clamp for mounting a flat tool blade to a reciprocatory actuating bar of a power tool, said blade clamp comprising: a blade clamp body secured to said actuating bar and formed with a cavity having an exteriorly open mouth into which said tool blade is insertable lengthwise, a first substantially planar interior wall formed in said cavity extending substantially parallel to the direction of reciprocation of said actuating bar and defining one sidewall of said mouth, an abutment adjacent said first wall limiting insertion of a flat blade into said cavity, a second interior wall formed in said cavity opposite said first wall and inclined relatively to the direction of reciprocation of said actuating bar toward said cavity mouth, a cylindrical roller freely movable within said cavity between said first and second walls, resilient means acting between said blade clamp body and that side of said cylindrical roller opposite said cavity mouth for urging said roller toward said cavity mouth to clamp a flat blade against said first interior cavity wall, and operator influenced tool blade release means shiftably supported on said blade clamp body and engageable with that side of said cylindrical roller facing said cavity mouth for moving said roller against the influence of said resilient means.

2. A blade clamp as set forth in claim 1 in which said blade clamp body cavity is formed with an exteriorly open passageway spaced from said mouth, in which said resilient means comprises a leaf spring secured to said blade clamp body, extending through said passageway for engagement with the opposite side of said roller from said cavity mouth, and in which said tool blade release comprises a leaf spring secured to said blade clamp body, extending exteriorly of said blade clamp body for operator access, and terminating adjacent said cavity mouth.

3. A blade clamp as set forth in claim 2 in which both the leaf spring comprising the resilient means and the leaf spring comprising the tool blade release means are formed as oppositely extending arms of a single leaf spring member.

4. A blade clamp as set forth in claim 1 in which said tool blade release means comprises a plunger slidably constrained through said blade clamp body, said plunger having an operator accessible exterior extremity and an opposite extremity within said cavity adjacent said cavity mouth for engagement with said cylindrical roller.

5. A blade clamp as set forth in claim 1 in which said cylindrical roller includes a central knurled cylindrical portion and coaxial smooth cylindrical stem portions of smaller diameter than said knurled portion one at each side of said knurled portion, and in which said second interior wall in said cavity is formed with a clearance slot accommodating said knurled portion of said roller.

6. A blade clamp for mounting a tool blade of rectangular cross sectional shape having flat sides and narrow edges to a reciprocating actuating bar of a power tool said blade clamp comrising: a blade clamp body secured to said actuating bar and formed with a cavity having an exteriorly open mouth, said cavity including a main portion from which extends a tool blade accommodating portion into which a tool blade is insertable lengthwise, a first substantially planar interior wall in said tool blade accommodating cavity portion; said first wall extending substantially parallel to the direction of reciprocation of said actuating bar and locating a tool blade therein with only one narrow edge thereof extending into said main cavity portion, a second interior wall formed in said main cavity portion opposite said first wall and inclined relatively to the direction of reciprocation of said actuating bar toward said cavity mouth, a roller having circular cross sectional shape freely movable within said main cavity portion, resilient means acting between said blade clamp body and that side of said roller opposite said cavity mouth for urging said roller between said inclined second cavity wall and the one narrow edge of a tool blade extending into said main cavity portion, and operator influenced tool blade release means shiftably supported on said blade clamp body and engageable with that side of said roller facing said cavity mouth for moving said roller against the influence of said resilient means.

* * * * *